United States Patent Office 2,740,809
Patented Apr. 3, 1956

2,740,809

RESOLUTION OF PHENYLAMINOPROPANEDIOLS AND INTERMEDIATES

Walter A. Gregory, Wilmington, Del., assignor to E. I. du Pont de Nemours and Company, Wilmington, Del., a corporation of Delaware No Drawing. Application August 24, 1953, Serial No. 376,261

11 Claims. (Cl. 260—519)

This invention relates to the separation of enantiomorphic forms of diastereoisomeric substituted amino propanediols. More particularly, the present invention provides a practical method for the production of an optically active diastereoisomer of a substituted amino propanediol using as a resolving agent an optically active acylating agent having two similar asymmetric carbon atoms.

In the practice of the present invention, reaction between the enantiomorphic forms of a diastereoisomeric substituted phenyl amino propanediol having the formula 1.
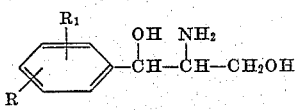

where R is an organic radical selected from the class consisting of lower alkyl mercapto, lower alkyl sulfinyl, lower alkyl sulfonyl, sulfamyl, lower alkyl substituted sulfamyl, hydrazidosulfonyl, and azidosulfonyl radicals and $R_1$ is a radical selected from the class consisting of hydrogen, halogen, lower alkyl and lower alkoxyl, and an optically active acylating agent having the formula 2.
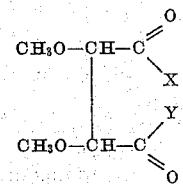

where X and Y standing together represent oxygen, and standing separately represent lower alkoxy radicals, is effected in a liquid medium. By lower alkyl and lower alkoxyl is meant an alkyl or alkoxy radical having not more than six carbon atoms.

The resulting reaction products are diastereomorphic amides represented by the formula 3.
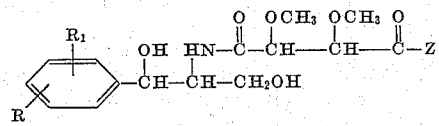

where R and $R_1$ have the same significance as above and Z is a radical selected from the class consisting of hydroxyl and lower alkoxy radicals.

I have found that there is a marked difference in the solubility of the diastereoisomeric forms of the compounds of Formula 3 and thereby have found a way of readily separating either the dl-threo pair or the dl-erythro pair of the compounds represented by Formula 1.

In a preferred aspect of my invention $R_1$ is hydrogen and R is attached to the phenyl ring in a position para to the aminopropanediol substituent.

Illustrative of the compounds of Formula 1 which can be resolved in accordance with my invention there may be mentioned:

(dl)-threo-1-(p-methylsulfonylphenyl)-2-amino-1,3-propanediol (dl)-threo-1-(p-ethylfonylphenyl)-2-amino-1,3-propanediol (dl)-threo-1-(p-normal-propylsulfonylphenyl)-2-amino-1,3-propanediol (dl)-threo-1-(p-isopropylsulfonylphenyl)-2-amino-1,3-propanediol (dl)-threo-1-(p-methylmercaptophenyl)-2-amino-1,3-propanediol (dl)-threo-1-(p-methylsulfinylphenyl)-2-amino-1,3-propanediol (dl)-threo-1-(p-sulfamylphenyl)-2-amino-1,3-propanediol (dl)-threo-1-(p-methylsulfamylphenyl)-2-amino-1,3-propanediol (dl)-threo-1-(p-dimethylsulfamylphenyl)-2-amino-1,3-propanediol (dl)-threo-1-(p-ethylsulfamylphenyl)-2-amino-1,3-propanediol (dl)-threo-1-(p-beta-hydroxyethylsulfamylphenyl)-2-amino-1,3-propanediol (dl)-threo-1-(p-hydrazidosulfonylphenyl)-2-amino-1,3-propanediol (dl)-threo-1-(p-azidosulfonylphenyl)-2-amino-1,3-propanediol It will be noted that the dimethoxy succinic anhydride or full ester described by Formula 2 and employed as the resolving agent in the processes of the invention contains two similar asymmetric carbon atoms. The use of such a resolving agent is an essential feature of my invention.

Of the resolving agents represented by Formula 2 I prefer d-dimethoxysuccinic anhydride. When the anhydride is employed the reaction between it and the racemic mixture is exothermic but is readily controlled by external cooling.

Illustrative of the resolving agents which can be employed in the processes of my invention are:

d-dimethoxysuccinic anhydride
d-dimethoxysuccinic acid dimethyl ester
d-dimethoxysuccinic acid diethyl ester The resolving agents listed above as illustrative can be prepared from d-tartaric acid and diethyl-d-tartrate both of which are commercially available. The dimethyl ester can be prepared by a procedure similar to that used for the diethyl ester. d-Dimethoxysuccinic anhydride can be prepared from diethyl-d-tartrate by methylation with methyl iodide and silver oxide according to the procedure described by T. Purdie and J. C. Irvine (J. Chem. Soc., 79, 957 (1901)). The resulting d-dimethoxysuccinic acid diethyl ester can be hydrolyzed to the free acid using aqueous barium hydroxide according to the procedure described by O. T. Schmidt and H. Zeiser (Ber. 67, 2120 (1934)). d-Dimethoxysuccinic acid can be converted to d-dimethoxysuccinic anhydride by refluxing the free acid with excess acetyl chloride according to the procedure described by T. Purdie and C. R. Young (J. Chem. Soc. 97, 1524 (1910)).

In the reaction between the enantiomorphic forms of the diastereoisomeric substituted amino propanediols and the resolving agent an inert liquid medium is employed. There may be used, for example, alkyl ethers, dioxane, chlorinated hydrocarbons and the like. A weakly basic medium is preferred, particularly when the resolving agent is an anhydride. A tertiary amine, such as, for instance, pyridine, N-methylmorpholine, triethylamine, is particularly preferred as the weakly basic medium. Of the tertiary amines pyridine is especially preferred. Other organic solvents such as dioxane can be used in conjunction with the basic medium.

When the resolution is carried out using d-dimethoxysuccinic anhydride, the free acid corresponding to Formula 3 where Z is hydroxyl, is obtained. This can be recovered from the reaction medium by extraction with aqueous sodium bicarbonate solution. If a basic medium such as a tertiary amine is employed, the reaction mixture following completion of the reaction between the aminopropanediol and the resolving agent is made acid to neutralize the tertiary amine and set free the desired acid.

When the resolution is carried out using an ester of d-dimethoxysuccinic acid, a product corresponding to Formula 3 where Z is a lower alkoxy radical is obtained. Here care should be exercised that the reaction mixture is not subjected to high temperatures, since at high temperatures alcohol can be eliminated with formation of the corresponding dimethoxysuccinimide derivatives. The ester amide corresponding to Formula 3 where Z is a lower alkoxy radical can be converted to the free acid by simple hydrolytic procedures, care being taken not to leave the amide linkage. This can be accomplished by carrying out the hydrolysis in an aqueous-alcoholic solution by slow addition of stoichiometric amount of strong alkali, care being taken to keep the pH below about 10.5.

No elaborate crystallization is required to purify the resulting diastereomorphic amides represented by Formula 3. The diastereomorphic amides are then separated taking advantage of the differences in physical properties, particularly in their solubility. After separation has been effected, the amide linkage as shown in Formula 3 is cleaved by hydrolysis resulting in the production of two separate (d and l) optically active aminopropanediols corresponding to Formula 1. The separation of the diastereomorphs, represented by Formula 3, is most advantageously carried out where Z is a hydroxyl radical. However, separation can be effected where Z is a lower alkoxy radical.

After separation of the diastereomorphs (corresponding to Formula 3) has been effected and the succinamide linkage has been hydrolyzed, the two separate (d and l) optically active aminopropanediols corresponding to Formula 1 can be separated from the dimethoxysuccinic acid resolving agent by any convenient method, for example, by employing suitable ion exchange materials. Use of the anion-exchanger will remove the d-dimethoxysuccinic acid from the reaction medium thus leaving either pure d- or l-optically active aminopropanediol in solution.

The individual isomers prepared by the methods of this invention when converted to their acylamido derivatives are useful as bactericides and antibiotics. They are fully described and claimed in my copending applications Serial Nos. 257,986, 296,959, now U. S. Patent 2,680,135, and 333,020, now U. S. Patent 2,680,120, respectively filed November 23, 1951, July 2, 1952, and January 23, 1953.

In order to better understand the nature of this invention reference should be had to the following illustrative example:

*Resolution of (dl)-threo-1-(p-methylsulfonylphenyl)-2-amino-1,3-propanediol*

A solution of 10.7 g. of (dl)-threo-1-(p-methyl-sulfonylphenyl)-2-amino-1,3-propanediol in 40 cc. of pyridine is stirred as 7.25 g. of d-dimethoxysuccinic anhydride is added portionwise. The temperature of the reaction mixture is kept below 30° C. The addition is completed in 17 minutes, and the reaction is allowed to continue for a period of 30 minutes.

The resulting solution is concentrated under reduced pressure. The residue is dissolved in 75 cc. of water. The aqueous solution is made acid by adding 10% hydrochloric acid. White crystals separate from the solution. This crystalline material weighing 5.44 g. has a melting range of 190–192.5° C. after a preliminary melting and resolidifying. Further product is obtained by concentrating the filtrate.

During the melting of this material initial liquefaction occurs at about 115–130° C. with evolution of some volatile material. Resolidification occurs on continued heating, and the material finally melts at 190–198° C. depending upon its purity. This suggests that the product obtained as represented in Formula 3 where Z is a hydroxyl radical loses water on heating with the formation of an intermediate dimethoxysuccinimide derivative and that the final melting point reached is the melting point of this substituted succinimide.

The reaction product can be purified by recrystallization from hot water, but is best purified by dissolving in cold water by adding ammonium hydroxide and reprecipitating with hydrochloric acid.

A 5.32 g. portion of the crude reaction product is dissolved in 20 cc. of water by adding ammonium hydroxide. The ammoniacal solution is filtered and then made acid with dilute hydrochloric acid. The product crystallizes as white prisms; yield, 4.2 g. melting 192–194° C. after first melting and resolidifying at 115–130° C. By repeating this recrystallization a product melting 196–198° C. can be obtained. Even the lower melting portion is sufficiently pure to convert to the free amine. The product of this reaction is N-l-threo-[2,2'-dihydroxy-2-(p-methylsulfonylphenyl)isopropyl] d-α,β-dimethoxysuccinamic acid and can be represented graphically as follows:

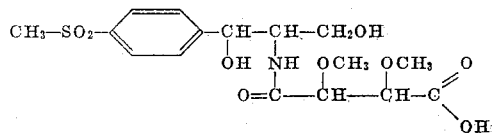

The d-dimethoxysuccinic acid from the d-threo-1(p-methylsulfonylphenyl)-2-amino-1,3-propanediol remains in the water filtrates, and may be obtained by concentrating these filtrates. It melts about 110° C. without resolidifying and need not be highly purified in order to separate the d base from it.

The l-base is obtained by refluxing 5.4 g. of the d-dimethoxysuccinamic acid of the l-base in 25 cc. of water containing 5 cc. of concentrated hydrochloric acid for a period of 2 hours, passing the solution through a column charged with IRA-400 resin, a weakly basic resin, on the basic cycle and concentrating the effluent and washings under reduced pressure. The product crystallizes as white needles melting 140–142° C. $[\alpha]_D^{25} = -20°$ (1% in ethanol) and may be crystallized from absolute ethanol.

The d-base can be obtained from the d-dimethoxysuccinamic acid of the d-threo-1-(p-methylsulfonylphenyl)-2-amino-1,3-propanediol by the same procedure used for the l-base. The base so obtained may contain some of the l-base, but is readily purified by recrystallizing from ethanol in that the (dl)-base is more soluble.

I claim:

1. A process which comprises mixing in a liquid medium enantiomorphs of a diastereoisomeric substituted phenyl amino propanediol having the formula

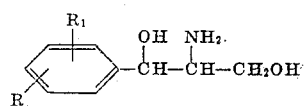

where R is an organic radical selected from the class consisting of lower alkyl mercapto, lower alkyl sulfinyl, lower alkyl sulfonyl, sulfamyl, lower alkyl substituted sulfamyl, hydrazidosulfonyl, and azidosulfonyl radicals and $R_1$ is a radical selected from the class consisting of hydrogen, halogen, lower alkyl and lower alkoxyl, and an optically active acylating agent having the formula

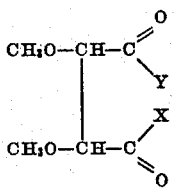

where X and Y standing together represent oxygen and standing separately represent lower alkoxyl radicals, to give a diastereoisomeric amide having the formula

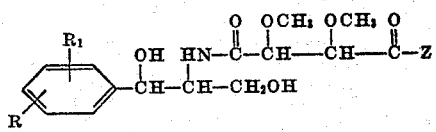

where R and R₁ have the same significance as above and Z is hydroxyl when X and Y standing together represent oxygen and is a lower alkoxy radical when X and Y standing separately represent lower alkoxy radicals.

2. A process which comprises mixing in a liquid medium the enantiomorphic forms of a diastereoisomeric 1-(p-methylsulfonylphenyl)-2-amino-1,3-propanediol with an optically active acylating agent having the formula

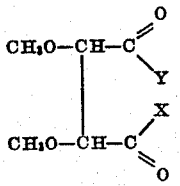

where X and Y standing together represent oxygen and standing separately represent lower alkoxyl radicals.

3. A process which comprises mixing in a liquid medium the enantiomorphic forms of 1-(p-methylsulfonyl-phenyl)-2-amino-1,3,-propanediol with $d$-dimethoxysuccinic anhydride.

4. A process which comprises mixing in a weakly basic medium the enantiomorphic forms of 1-(p-methylsulfonyl-phenyl)-2-amino-1,3,-propanediol with $d$-dimethoxysuccinic anhydride.

5. A process which comprises mixing in a liquid medium the enantiomorphic forms of 1-(p-methlysul-famylphenyl)-2-amino-1,3-propanediol with $d$-dimethoxysuccinic anhydride.

6. A process which comprises mixing in a liquid medium the enantiomorphic forms of 1-(p-sulfamyl-phenyl)-2-amino-1,3,-propanediol with $d$-dimethoxysuccinic anhydride.

7. A process which comprises mixing in a liquid medium ($dl$)-threo-1-(p-methylsulfonylphenyl)-2-amino-1,3-propanediol with $d$-dimethoxysuccinic anhydride.

8. A diastereomorphic amide of the formula

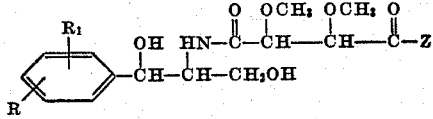

where R is an organic radical selected from the class consisting of lower alkyl mercapto, lower alkyl sulfinyl, lower alkyl sulfonyl, sulfamyl, lower alkyl substituted sulfamyl, hydrazidosulfonyl, and azidosulfonyl radicals and R₁ is a radical selected from the class consisting of hydrogen, halogen, lower alkyl and lower alkoxyl and Z is a radical selected from the class consisting of hydroxyl and lower alkoxy radicals.

9. A compound of the formula

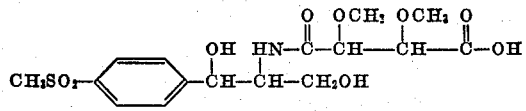

10. A process which comprises mixing in an inert liquid medium a mixture consisting of the dextro and levo-isomers of the threo-form of a substituted phenylamino-propanediol having the formula

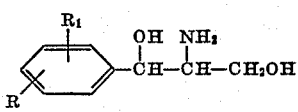

where R is an organic radical selected from the class consisting of lower alkyl mercapto, lower alkyl sulfinyl, lower alkyl sulfonyl, sulfamyl, lower alkyl substituted sulfamyl, hydrazidosulfonyl, and azidosulfonyl radicals and R₁ is a radical selected from the class consisting of hydrogen, halogen, lower alkyl and lower alkoxyl, with $d$-dimethoxy succinic anhydride to give diastereoisomeric amides of the formula

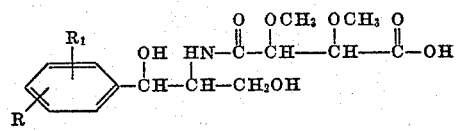

where R and R₁ have the same significance as above, adding water to the resulting mixture of isomers, whereupon one of the isomers dissolves in the water, the insoluble isomer is collected, and the amide isomers thus separated are individually hydrolyzed to give the dextro-isomer of said threo-substituted phenylaminopropanediol and the levo-isomer of said threo-substituted phenyl-amino propanediol.

11. A process for resolving the $d$- and $l$-isomers of threo - 1 - (p - methylsulfonylphenyl) - 2 - amino - 1,3 - propanediol which comprises mixing said isomers with $d$-dimethoxysuccinic anhydride in a weakly basic medium to give two diastereoisomeric forms of an amide of the formula

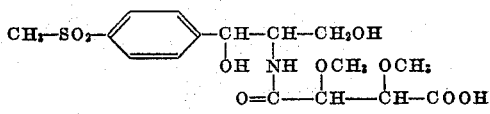

adding water to the diastereoisomeric amides, collecting the water-insoluble N-$l$-threo-[2,2'-dihydroxy-2-(p-methylsulfonylphenyl)isopropyl]-$d$-alpha,beta-dimethoxysuccinamic acid, and hydrolyzing said acid to give $l$-threo-1-(p-methylsulfonylphenyl)-2-amino-1,3-propanediol.

References Cited in the file of this patent

UNITED STATES PATENTS

| | | |
|---|---|---|
| 2,483,885 | Crooks et al. | Oct. 4, 1949 |
| 2,680,120 | Gregory | June 1, 1954 |
| 2,680,135 | Gregory | June 1, 1954 |

OTHER REFERENCES

Cutler: "JACS," vol. 74, Nov. 5, 1952, pp. 5475–81.
Suter et al.: "JACS," vol. 75, Sept. 5, 1953, pp. 4330–33.